(12) United States Patent
Evers et al.

(10) Patent No.: US 9,227,798 B2
(45) Date of Patent: Jan. 5, 2016

(54) LIVESTOCK LOADER AND METHOD

(71) Applicant: Cooper Farms, Inc., Fort Recovery, OH (US)

(72) Inventors: Alan Evers, New Weston, OH (US); Roger Lennartz, Fort Recovery, OH (US)

(73) Assignee: Cooper Farms, Inc., Fort Recovery, OH (US)

( * ) Notice: Subject to any disclaimer, the term of this patent is extended or adjusted under 35 U.S.C. 154(b) by 0 days.

(21) Appl. No.: 14/329,007

(22) Filed: Jul. 11, 2014

(65) Prior Publication Data
US 2014/0318477 A1    Oct. 30, 2014

Related U.S. Application Data

(62) Division of application No. 13/326,739, filed on Dec. 15, 2011, now Pat. No. 8,794,190.

(60) Provisional application No. 61/423,434, filed on Dec. 15, 2010.

(51) Int. Cl.
| B65G 11/14 | (2006.01) |
| B65G 67/04 | (2006.01) |
| A01K 29/00 | (2006.01) |
| A01K 1/02 | (2006.01) |
| B60P 3/04 | (2006.01) |

(52) U.S. Cl.
CPC .............. *B65G 67/04* (2013.01); *A01K 1/0272* (2013.01); *A01K 29/00* (2013.01); *B60P 3/04* (2013.01)

(58) Field of Classification Search
CPC ......... B60P 3/04; B60P 1/436; A01K 45/005; B65G 21/14
USPC ......... 119/843–849, 840, 400, 401, 404, 405; 198/588, 313, 581; 193/38, 35 TE
See application file for complete search history.

(56) References Cited

U.S. PATENT DOCUMENTS

| 754,775 | A | | 3/1904 | Johnson |
| 852,314 | A | | 4/1907 | Bourne |
| 880,665 | A | | 3/1908 | Hopper |
| 981,613 | A | * | 1/1911 | Carter .............................. 193/38 |

(Continued)

FOREIGN PATENT DOCUMENTS

GB      2236718 A    4/1991

*Primary Examiner* — Kristen C Hayes
(74) *Attorney, Agent, or Firm* — James L. Young; Westman, Champlin & Koehler, P.A.

(57) ABSTRACT

An apparatus including a first compartment and a second compartment is disclosed through which livestock animals move. The first compartment includes a first extension that is horizontally extendable and retractable. The second compartment is vertically movable and includes a second extension that is horizontally extendable and retractable. A method includes positioning a first end of an apparatus proximate a doorway of a building that contains a plurality of livestock animals; extending a first extension to the doorway; positioning a vehicle proximate a second end of the apparatus; moving at least one of the livestock animals from the building and into a first compartment; moving the animal from the first compartment to a second compartment; vertically moving the second compartment to a level of a deck of the vehicle; extending a second extension to the deck; and moving the animal from the second compartment onto the vehicle deck.

19 Claims, 9 Drawing Sheets

(56) References Cited

U.S. PATENT DOCUMENTS

| | | | |
|---|---|---|---|
| 3,214,136 A | 10/1965 | Marks | |
| 3,420,211 A * | 1/1969 | Hartvickson | 119/846 |
| 3,602,198 A * | 8/1971 | Tackett et al. | 119/846 |
| 3,722,477 A * | 3/1973 | Weldy et al. | 119/846 |
| 3,894,515 A * | 7/1975 | Plyler | 119/847 |
| 3,896,944 A * | 7/1975 | Idoffsson | 414/344 |
| 3,970,045 A | 7/1976 | Graham, Jr. | |
| 4,074,658 A | 2/1978 | Mermelstein et al. | |
| 4,293,158 A | 10/1981 | Lewis et al. | |
| 4,499,856 A * | 2/1985 | Hecht et al. | 119/843 |
| 4,924,813 A | 5/1990 | Bixler et al. | |
| 5,660,147 A * | 8/1997 | Wills et al. | 119/846 |
| 5,699,755 A | 12/1997 | Wills et al. | |
| 6,447,234 B2 * | 9/2002 | Sinn et al. | 414/398 |
| 6,564,751 B2 * | 5/2003 | Anderson et al. | 119/845 |

\* cited by examiner

LIVESTOCK LOADER AND METHOD

CROSS REFERENCE TO RELATED APPLICATION

This application claims the benefit of priority from U.S. patent application Ser. No. 13/326,739, U.S. Pat. No. 8,794,190, filed Dec. 15, 2011, which claims the benefit of priority from U.S. Provisional Patent Application Ser. No. 61/423,434, filed Dec. 15, 2010, entitled "Livestock Loader;" these applications are fully incorporated by reference herein.

BACKGROUND

Livestock is typically raised in a facility that is remote from a rendering facility. Thus, the animals must be transported from the facility in which they are raised to the rendering facility, typically by a vehicle such a semi-truck trailer having multiple levels of animal transport decks. Typically, livestock such as hogs are conveyed from a structure such a barn to a truck trailer by means of a ramped gang way. Because the deck levels of the truck are generally higher in elevation than a level of the barn door, the livestock must generally negotiate an uphill inclined ramp. Moreover, such a gang way is usually exposed to the elements, thereby causing the livestock to encounter an environment very different from that within the barn. Such changes in environment and the physical exertion required to climb the ramp can cause stress in the animals. Hogs, in particular, are particularly vulnerable to such stress, which can increase mortality and cause physical changes in their bodies that can undesirably affect the quality of the meat produced therefrom.

SUMMARY

In one aspect, an apparatus is disclosed through which livestock animals move between a building and a vehicle. The apparatus comprises a first compartment and a second compartment. The first compartment comprises a first extension that is horizontally extendable and retractable. The second compartment is vertically movable with respect to the first compartment and comprises a second extension that is horizontally extendable and retractable.

In another aspect, a method comprises positioning a first end of an apparatus proximate a doorway of a building that contains a plurality of livestock animals; extending a first extension from the first end of the apparatus to the doorway; positioning a vehicle proximate a second end of the apparatus; moving at least one of the livestock animals from the building, onto the first extension and into a first compartment of the apparatus; moving the at least one of the livestock animals from the first compartment to a second compartment; vertically moving the second compartment of the apparatus to a level of a deck of the vehicle; extending a second extension from the second end of the apparatus to the deck; and moving the at least one of the livestock animals from the second compartment, onto the second extension and onto the vehicle deck.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure describes a livestock loader that keeps the livestock in a substantially enclosed environment while eliminating the need for the livestock to negotiate an upward inclined ramp. These features allow for the transport of such livestock from a barn to a transportation vehicle while minimizing stress on the animals.

Figure 1:
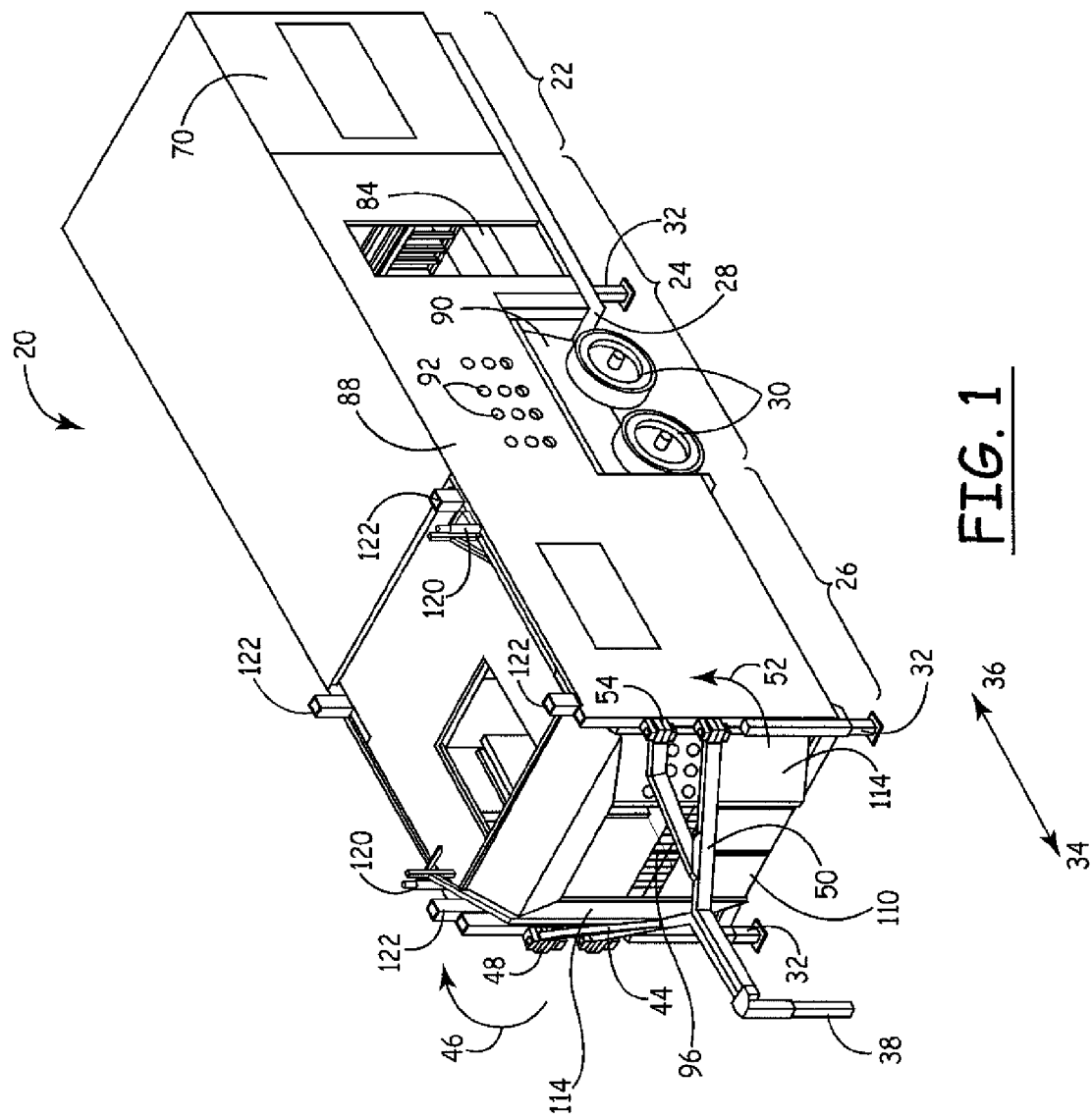
FIG. 1 is a front perspective view of an exemplary livestock loader.

FIG. 1 is a front perspective view of an exemplary livestock loader 20. In an exemplary embodiment, livestock loader 20 includes three primary compartments: slider pen 22, intermediate pen 24 and lift compartment 26. In an exemplary embodiment, the three compartments 22, 24 and 26 are disposed on a frame 28 that is carried upon wheels 30 and adjustable legs or leveling jacks 32.

Figure 2:
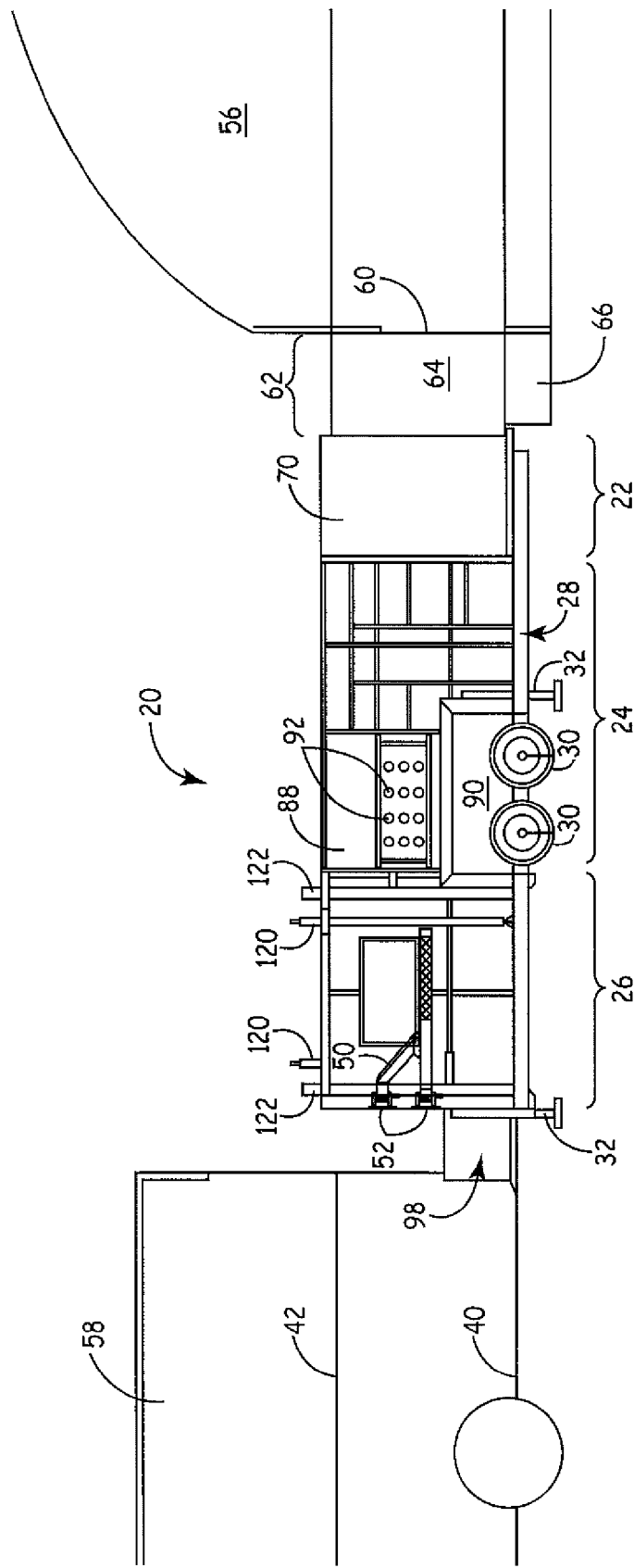
FIG. 2 is a side elevation schematic of an exemplary livestock loader positioned between a barn and a transport vehicle, configured for loading livestock onto a lower deck of the transport vehicle.
Figure 3:
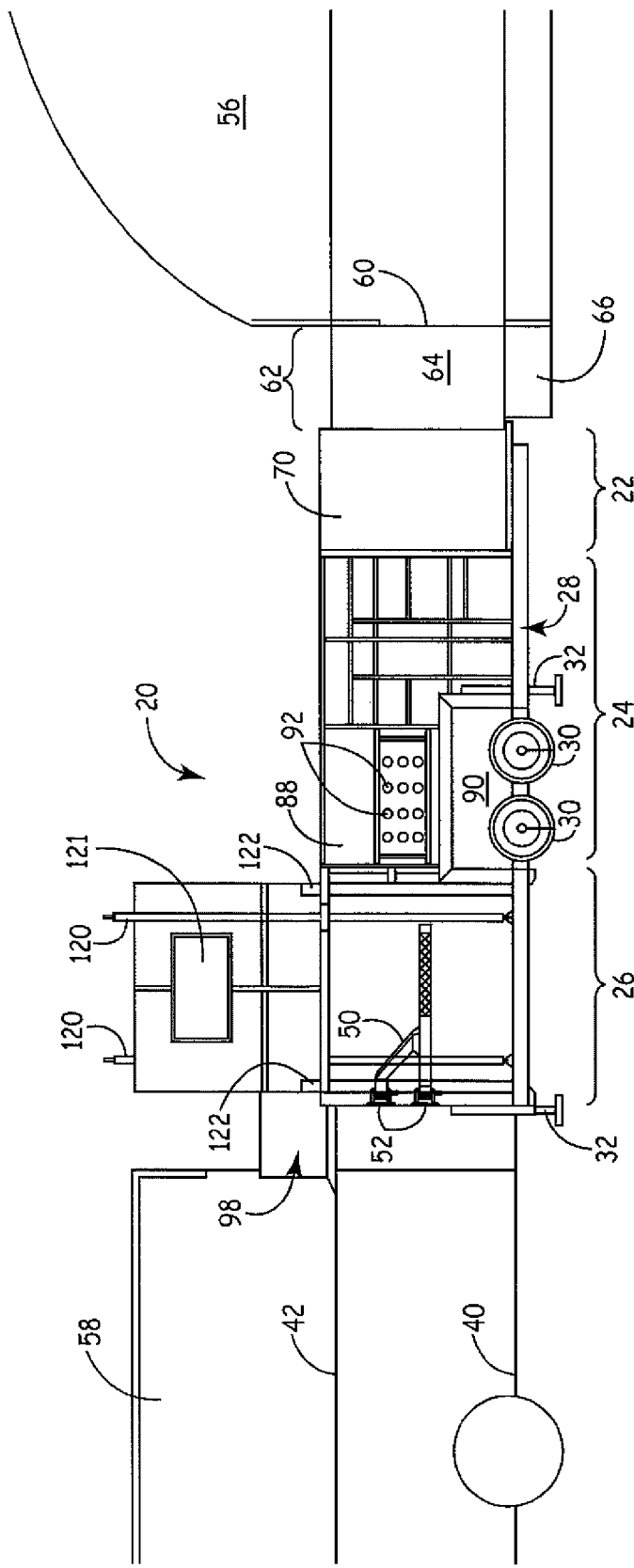
FIG. 3 is a side elevation schematic of an exemplary livestock loader positioned between a barn and a transport vehicle, configured for loading livestock onto an upper deck of the transport vehicle.

With reference to FIGS. 2 and 3, after loader 20 is positioned between barn 56 and transport vehicle 58, animals may be ushered from barn 58 through slider pen 22, intermediate pen 24, lift compartment 26, and into transport vehicle 58. In FIG. 2, loader 20 is configured to allow animals to be moved onto a lower deck 40 of transport vehicle 58. FIG. 3 shows lift compartment 26 in a raised position, as it would be for loading animals onto an elevated deck 42 of transport vehicle 58.

To transport loader 20 to a facility in which livestock are raised, such as a barn, loader 20 is typically towed by a vehicle via a hitch coupler 38 on a front of loader 20. For purposes of description, direction 34 will be considered the front or forward direction because it is the end of loader 20 that will be primarily pulled forward during transport. Thus, direction 36 will be considered the back or rear direction. In an exemplary embodiment, hitch coupler 38 is attached to loader 20 by a mechanism that allows it to be moved out of the way once towed to the desired position. In an exemplary use, a truck or other vehicle having a suitable hitch (e.g., a fifth wheel coupling) is coupled to hitch coupler 38.

Figure 9:
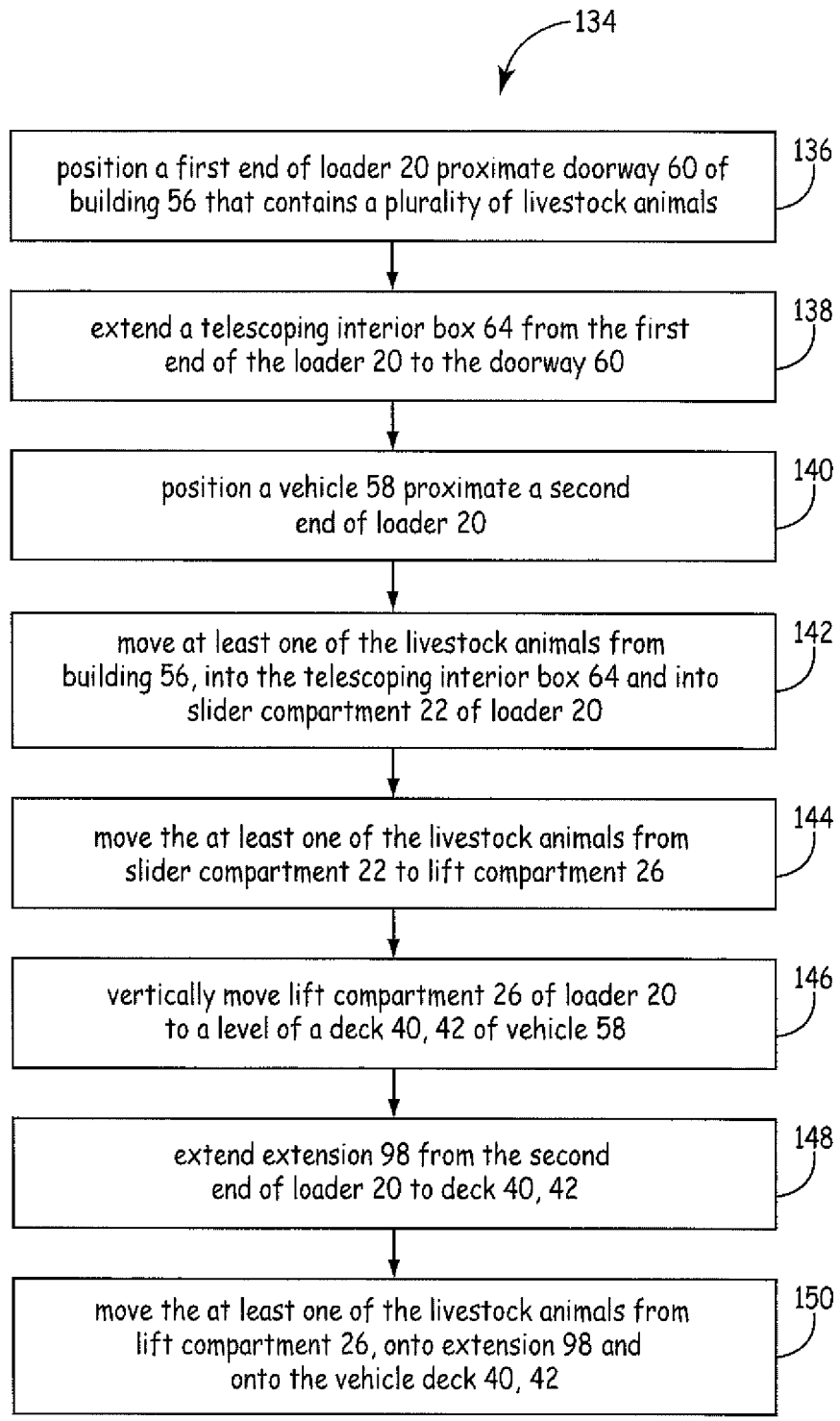
FIG. 9 is a flow diagram showing steps in an exemplary method for using the loader to move animals from a barn to a transport vehicle.

FIG. 9 is a flow diagram showing steps in an exemplary method 134 for using the loader to move animals from a barn to a transport vehicle. However, other steps and step sequencing are also described in this disclosure. Moreover, some steps may be performed more than once, as discussed below.

Figure 5:
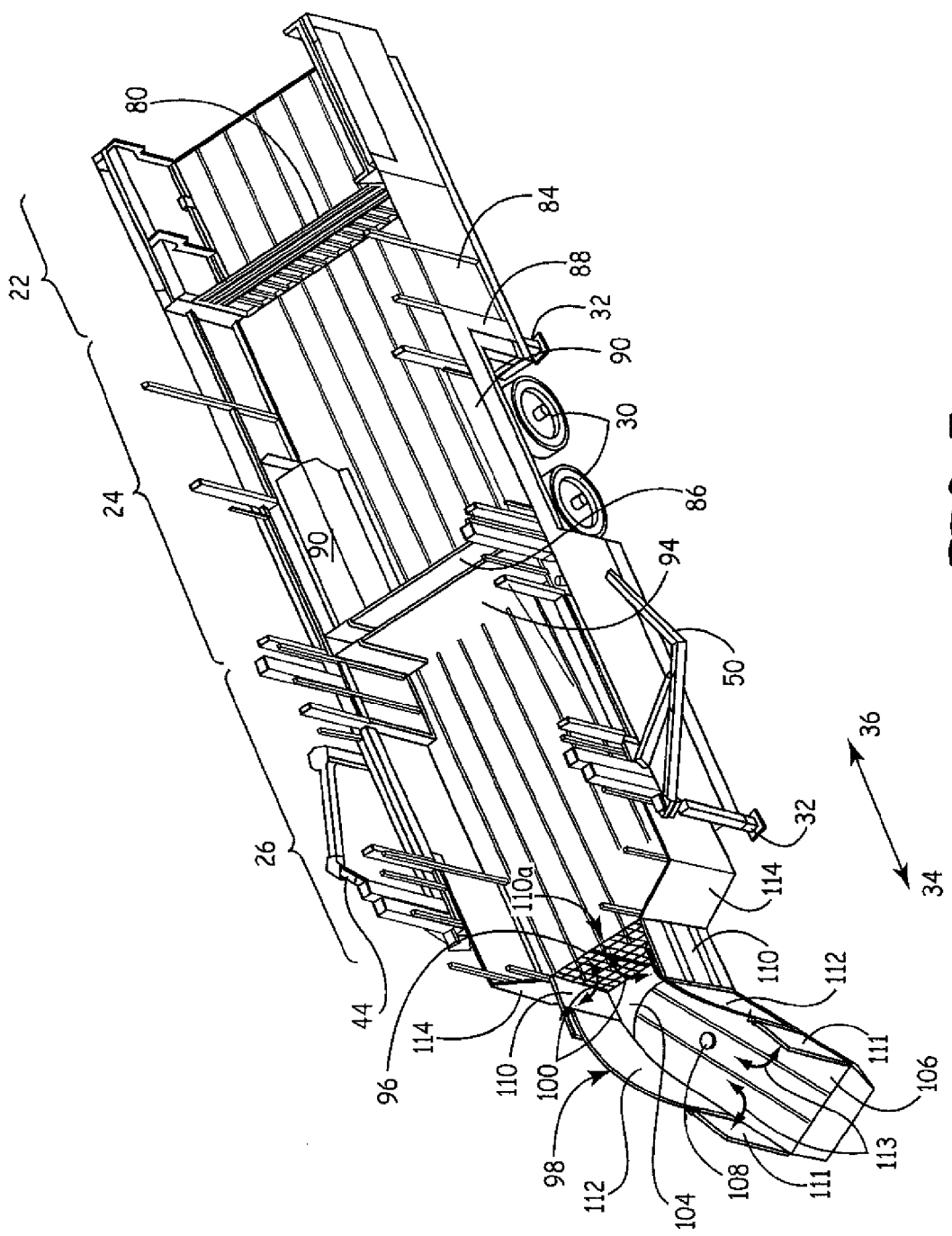
FIG. 5 is a top perspective view of the exemplary livestock loader with the roof and top portions of the sidewalls removed for clarity of description.

In an exemplary use, a vehicle operator tows loader 20 to a livestock raising facility such as barn 56, shown in FIG. 2. Once loader 20 is positioned so that slider pen 22 is placed proximate a facility opening such as a barn doorway 60, as described at step 136 of FIG. 9, the operator can unhitch the towing vehicle from hitch coupler 38. The operator then removes pins (not shown) connecting right swing arm 44 and left swing arm 50 (see FIG. 1). This allows right arm 44 to swing in direction 46 about pivot pin 48. Similarly, the operator can swing left arm 50 in direction 52 about pivot pin 54. In an exemplary embodiment, each arm 44, 50 can be pivoted to rest along the sides of frame 28, as shown in FIG. 5. With hitch coupler 38 thereby moved out of the way, a livestock transport vehicle 58, shown in FIG. 2, can then be maneuvered proximate the front end of the loader 20 for loading livestock from lift compartment 26, as described at step 140 of FIG. 9. As shown in FIGS. 2 and 3, loader 20 is thereby positioned between barn 56 and transport vehicle 58.

Figure 8:
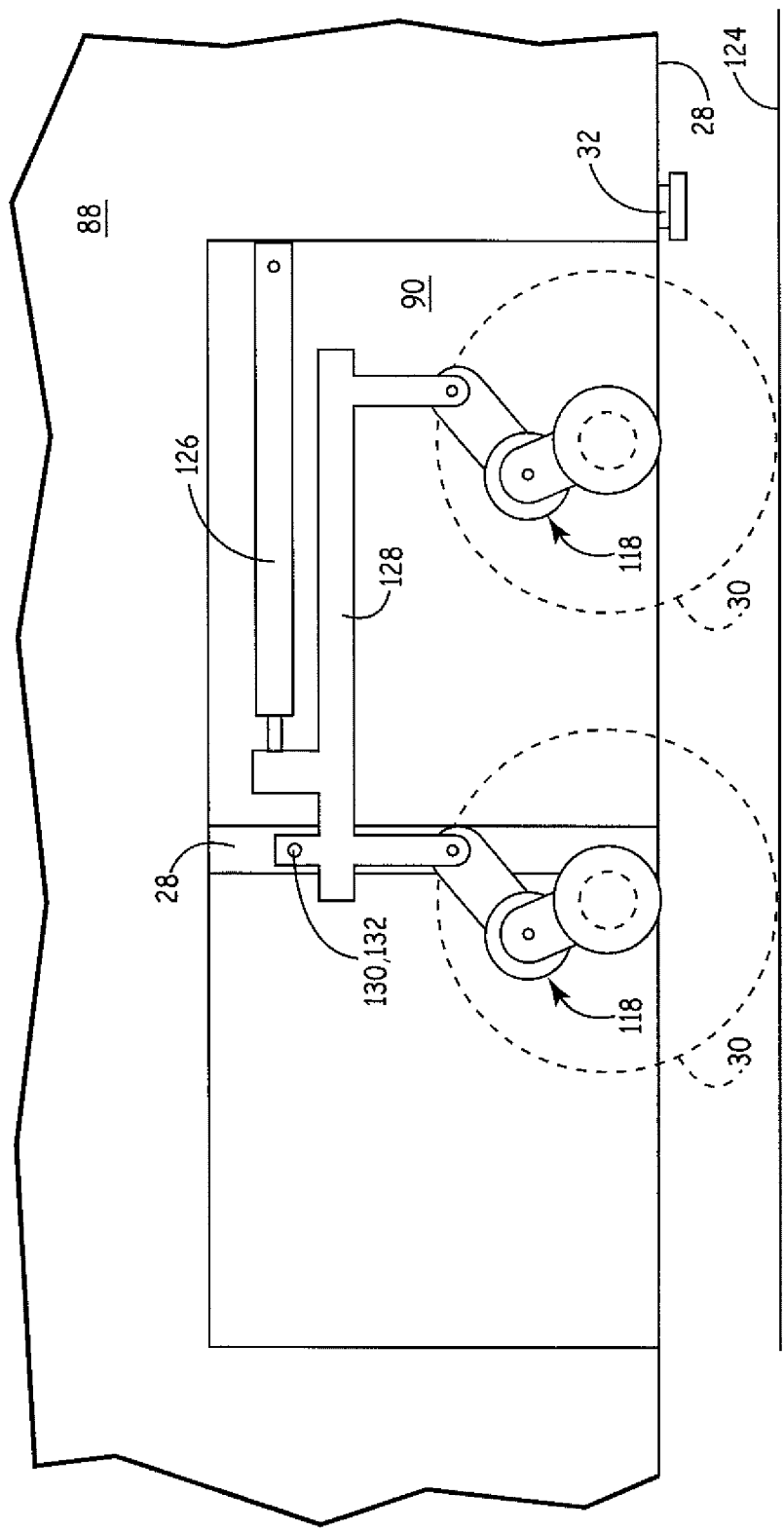
FIG. 8 is a side elevation view of a wheel well of the exemplary livestock loader with the wheels lowered to the ground and with the adjustable legs raised into the frame.

FIGS. 1-3 show adjustable legs 32 in a ground-contacting position; it is to be understood that during transport, adjustable legs 32 will be retracted up into frame 28, shown in FIG. 8. When loader 20 has been positioned by towing vehicle, adjustable legs 32 may then be extended downward to contact the ground surface 124 and be adjusted as desired to position frame 28.

Figure 4:
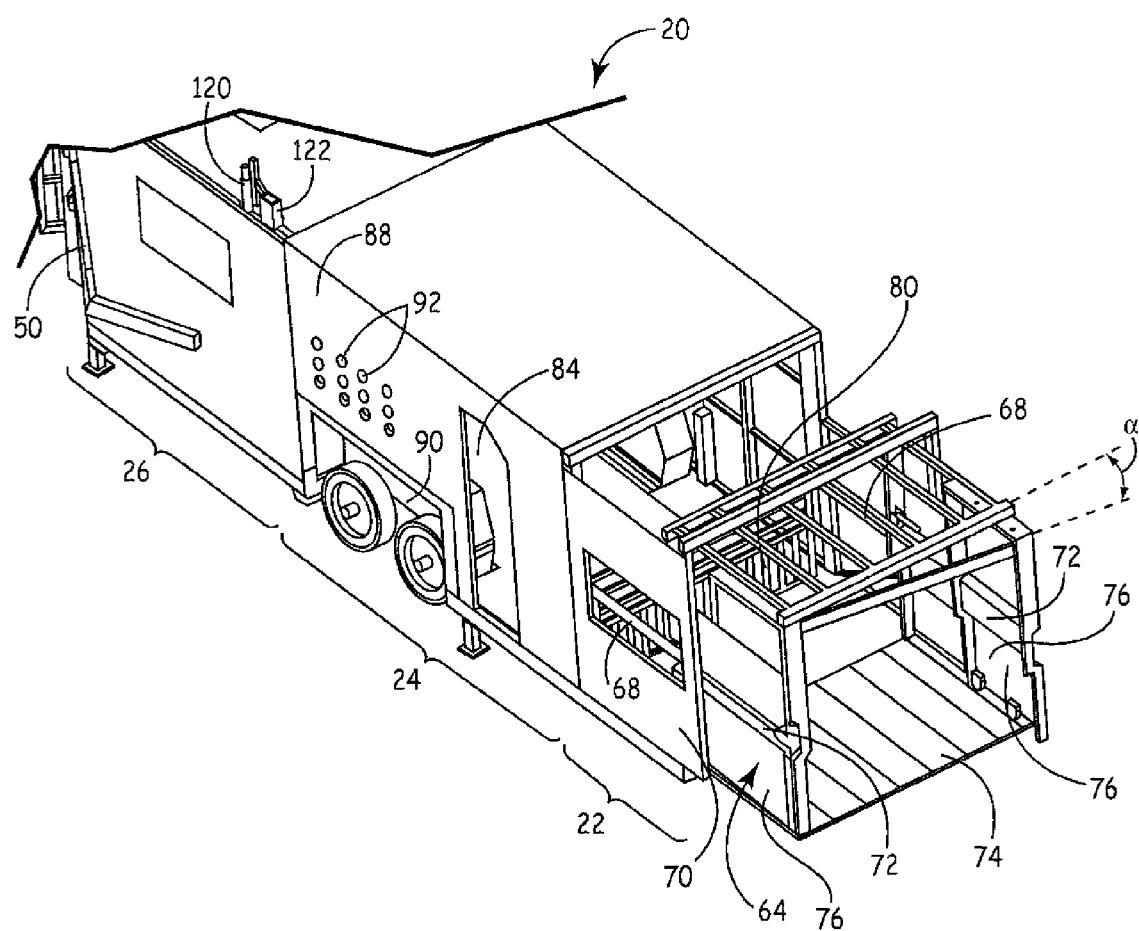
FIG. 4 is a rear perspective view of the exemplary livestock loader with an interior box telescoped out of the slider pen; portions of the roof are removed for clarity of description.

As shown in FIGS. 2 and 3, loader 20 is positioned so that slider pen 22 is proximate barn doorway 60. However, a gap 62 may remain between loader 20 and the barn doorway 60. To close gap 62, slider pen 22 in an exemplary embodiment is provided with a horizontally extendable and retractable extension such telescoping interior box 64 that extends horizontally from slider pen 22 toward barn 56 to close gap 62, as described at step 138 of FIG. 9. FIG. 4 is an exterior view of interior box 64 telescoped out of slider pen 22. In an exemplary embodiment, telescoping interior box 64 includes a floor 74, a ceiling (not shown), and two side walls 76, thus enclosing the box and isolating an interior of box 64 from an exterior thereof. Thus, animals conveyed through box 64 and into slider pen 22 will be protected and sheltered from exposure to outside environmental factors (e.g., wind, rain, snow, sunlight, etc). Further, in an exemplary embodiment, flexible gaskets (not shown) are provided on the rear wall and ceiling edges of box 64 to effectively seal box 64 against and exterior wall of barn 56. In an exemplary embodiment, each gasket is formed from a rolled sheet of plastic material. Once extended, floor 74 of box 64 rests on a concrete slab 66 disposed outside barn doorway 60. Thus, in an exemplary embodiment, level transitions are provided for animals to traverse; first from barn 56 into loader 20 and later from loader 20 to transport vehicle 58.

In an exemplary embodiment, hydraulic cylinders 68 are disposed horizontally along side walls 70 within channels 72. Hydraulic cylinders 68 control the telescoping extent of interior box 64 within slider pen 22. In an exemplary embodiment, all hydraulic cylinders of loader 20 are actuated through hydraulic lines connected to a hydraulic source that may, for example, be disposed on a towing vehicle. In an exemplary embodiment, hydraulic cylinders 68 on the left and right sides of loader 20 are independently plumbed so that they can be extended to different extents to meet the barn wall at an angle in case loader 20 is not positioned exactly perpendicular to the barn wall. As illustrated, right hydraulic cylinder 72 is extended to a greater extent than left hydraulic cylinder 72, thereby allowing box 64 to close an angle α (alpha) between loader 20 and barn 56.

Once loader 20 is in position with telescoping interior box 64 extended to surround the doorway 60 of barn 56, barn doorway 60 is opened to allow animals to be moved (i.e., be ushered or herded) into slider pen 22, as described at step 142 of FIG. 9. As shown in FIGS. 4 and 5, the animals are contained within slider pen 22 by a movable door or barrier 80. In this description, the terms doors and barriers are interchangeable. In an exemplary embodiment, barrier 80 is an upward-acting sectional door whose movement is manually actuated by a pull cord or hydraulically, mechanically, or electrically actuated by a lever or other control. In an exemplary embodiment, barrier 80 is a partial barrier that is open at the top. Thus, while the animals encounter the lower portion of barrier 80, air movement and visual sight lines for human operators is maintained. Barriers or doors, with windows or without, that extend partially or fully the height of each compartment 22, 24 and 26 can be used. Such barriers or doors may be formed of solid panel sections, open slat panels, and mesh panels of requisite strength, for example. Moreover, other styles of movable doors and barriers can be used (e.g., swinging gate, collapsible, etc.). When slider pen 22 is full of animals or at another desired time, an operator may lift or otherwise open barrier 80, thereby allowing the animals to move into intermediate pen 24. Animals such as hogs are often wary of moving into large empty spaces, so the division of loader 20 into smaller compartments facilitates the movement of the animals therethrough. However, when desired, the barrier 80 may be left open to facilitate faster movement of animals through loader 20.

A movable double door or barrier is provided between intermediate pen 24 and lift compartment 26 as shown in FIG. 5 to contain the animals within each of the intermediate pen 24 and lift compartment 26 as lift compartment 26 moves vertically with respect to intermediate pen 24. In an exemplary embodiment, first door 86 in pen 24 is an upward-acting sectional door. Side walls 88 of intermediate pen 24 are provided with wheel wells 90 surrounding wheels 30. In an exemplary embodiment, side walls 88 are provided with ports 92 for selective ventilation. For example, in warm weather, ports 92 may be opened to allow fresh air to circulate into intermediate compartment 24 from the outside. Moreover, fans can be used to blow air through intermediate pen 24 via ports 92. At other times, such as during cold weather, ports 92 can be closed to prevent exterior air from coming into intermediate pen 24. In an exemplary embodiment, an access door 84 is provided on side wall 88 to allow a person to easily enter and exit intermediate pen 24.

In FIG. 5, lift compartment 26 is shown lowered to the horizontal level of intermediate pen 24. In such a case, a user may open first door 86 and second door 94 (in compartment 26) between intermediate pen 24 and lift compartment 26 to allow animals to move from intermediate pen 24 to lift compartment 26. The movement of animals from slider pen 22 to lift compartment 26 (via intermediate pen 24 in the illustrated loader 20) is described in step 144 of FIG. 9. This movement can be encouraged by closing barrier 80 between slider pen 22 and intermediate pen 24 and/or using a hand-held board to close off rear access, thereby encouraging the animals to move forward. Once the animals are in lift compartment 26, second door 94 between intermediate pen 24 and lift compartment 26 is closed to contain the animals as lift compartment 26 is moved vertically up to the desired elevation, as described in step 146 of FIG. 9. Typically, an operator is in the lift compartment 26 with the animals so that he can operate the necessary controls to arrange for the exit of animals from lift compartment 26 to transport vehicle 58. In an exemplary embodiment, second door 94 is very similar in construction to first door 86. At least one of doors 86, 94 is preferably solid on at least a bottom portion so that animals in intermediate pen 24 do not see the vertical movement of animals in lift compartment 26 and vice versa.

At that time, an operator can begin reloading slider pen 22 with another group of animals. The provision of two staging areas, the first in slider pen 22 and the second in intermediate pen 24, allows for quicker loading of animals ultimately into transport vehicle 58. Slider pen 22 is effectively a continuation of barn 56 while intermediate pen 24 is a holding pen sized approximately the same as lift compartment 26, where the animals wait as lift compartment 26 transports other animals to the correct elevation for movement onto transport vehicle 58.

As shown in FIGS. 2, 3 and 5, horizontally extendable and retractable extension 98 bridges a gap between lift compartment 26 and a lower deck 40 or upper deck 42 of transport vehicle 58. Floor section 104 of extension 98 extends and retracts horizontally from under the floor section of lift compartment 26 along the directions 34 and 36. A swiveling floor portion 106 is attached to floor section 104 and pivots about pivot point 108. In an exemplary embodiment, swiveling portion 106 has a range of motion of about 180 degrees so that animals can be directed to the left or right from extension 98 or any direction between the left and right extremes. The side walls of extension 98 include doors 110 (shown open in FIG. 5) that may be selectively positioned to close opening 110a at the forward end of lift compartment 26. The side walls of extension 98 further include gates 111 positioned near a front end of swiveling portion 106, and flexible wall sections 112 that horizontally extend and retract from doors 110 to the extent needed to allow the side walls of extension 98 to accommodate various lengths and orientations of extension 98. In an exemplary embodiment, flexible wall sections 112 are constructed of a hard rubber sheet material.

In an exemplary embodiment, a set of interior gates 96 is provided inside of doors 110 to selectively close off opening 110a in order to contain the animals in lift compartment 26 even as the operator opens doors 110, extends floor section 104, directs the angle of swiveling portion 106, and extends wall sections 112, as described in step 148 of FIG. 9. In an exemplary embodiment, gates 96 are manually operable by an operator positioned in lift compartment 26 while gates 111 are hydraulically operable by the operator. In an exemplary embodiment shown in FIG. 5, gates 96 pivot open and shut as indicated by arrows 100 and gates 111 pivot open and shut as indicated by arrows 113. While FIG. 5 shows gates 96 closed and gates 111 open, an operator may choose to open gates 96 while leaving gates 111 closed, so that animals are allowed onto floor section 104 while extension 98 is being positioned relative to vehicle 58. This facilitates faster unloading of the animals and alleviates crowding in lift compartment 26.

In an exemplary embodiment, at least some of these steps may be performed by the operator by actuating controls for hydraulic cylinders that open and close doors 110, extend and retract floor section 104, change the angle of swiveling portion 106, extend and retract flexible wall sections 112 and open and close gates 111. Therefore, the operator may remain in lift compartment 26 with the animals until extension 98 is ready for the animals to move onto it. In an exemplary embodiment, the front end of lift compartment 26 has a tapered shape provided by angled walls 114 so that animals are naturally funneled out of the gates 96 and onto extension 98.

The second operator ushers the livestock animals from lift compartment 26, onto extension 98 and onto the vehicle deck 40, 42, as described in step 150 of FIG. 9. After the animals in lift compartment 26 have moved onto transport vehicle 58, an operator typically closes gates 111 and retracts extension 98 and flexible wall sections 112 just enough to clear the vehicle 58 to allow for vertical movement of lift compartment 26. Generally, gates 96 and doors 110 may remain open as side wall portions of extension 98. The operator lowers the empty lift compartment 26. When lift compartment 26 is lowered, an operator can then open first door 86 and second door 94 between intermediate pen 24 and lift compartment 26 to allow movement of all the animals from intermediate pen 24 to lift compartment 26.

In an exemplary embodiment, each of legs 32 of loader frame 28 is independently adjustable in an exemplary embodiment. In one arrangement, it may be necessary to extend legs 32 at different lengths from loader frame 28 to accommodate the terrain adjacent the barn 56 in an attempt to make the floor of the loader 20 as level as possible. Thus, from the animals' perspective, all movement between barn 56 and lift compartment 26 is conducted at substantially a single elevation so that the animals are not required to negotiate up or down inclined ramps as animals move from a building to a transport vehicle via loader 20.

Figure 6:
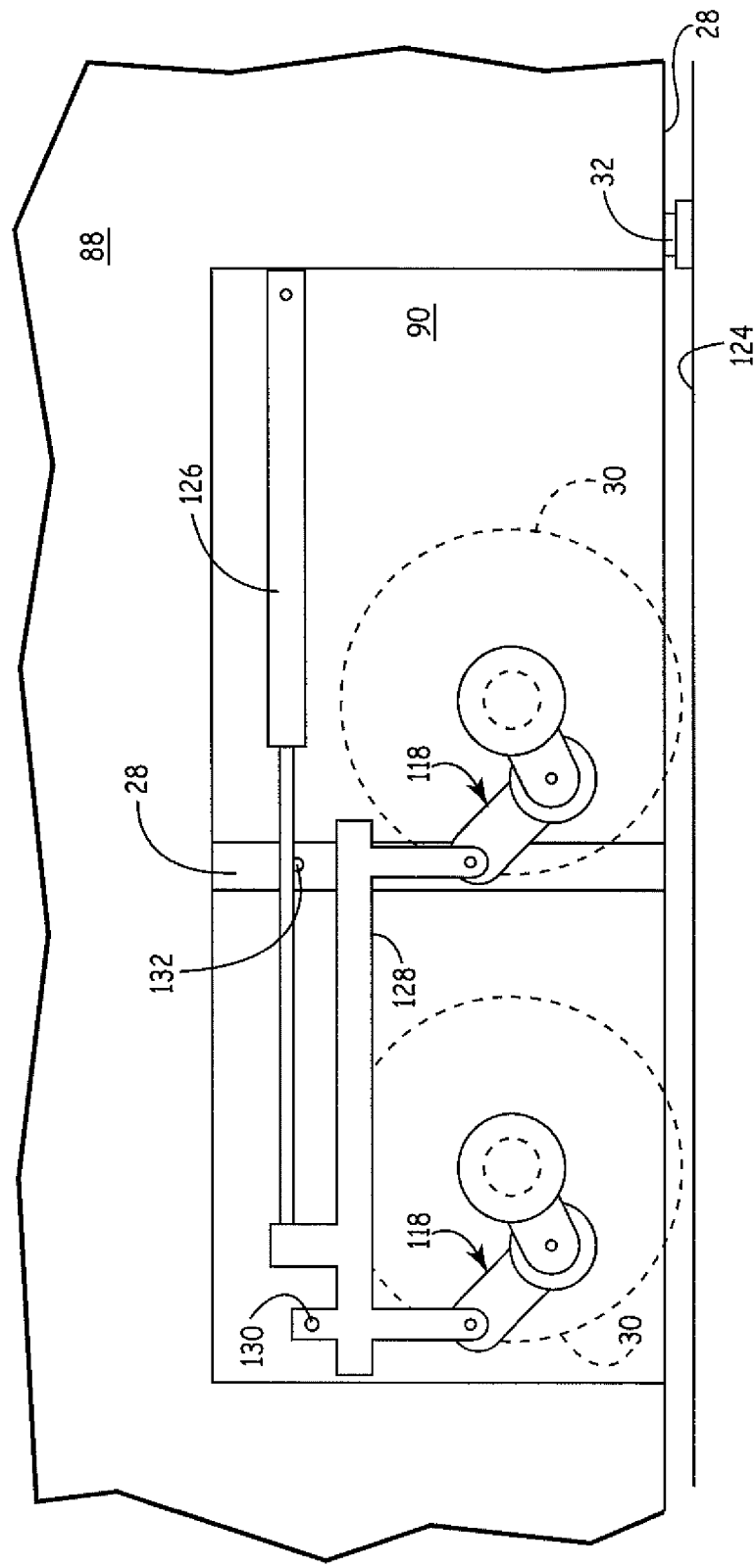
FIG. 6 is a side elevation view of a wheel well of the exemplary livestock loader with the wheels raised up into the well, and the loader resting on adjustable legs.
Figure 7:
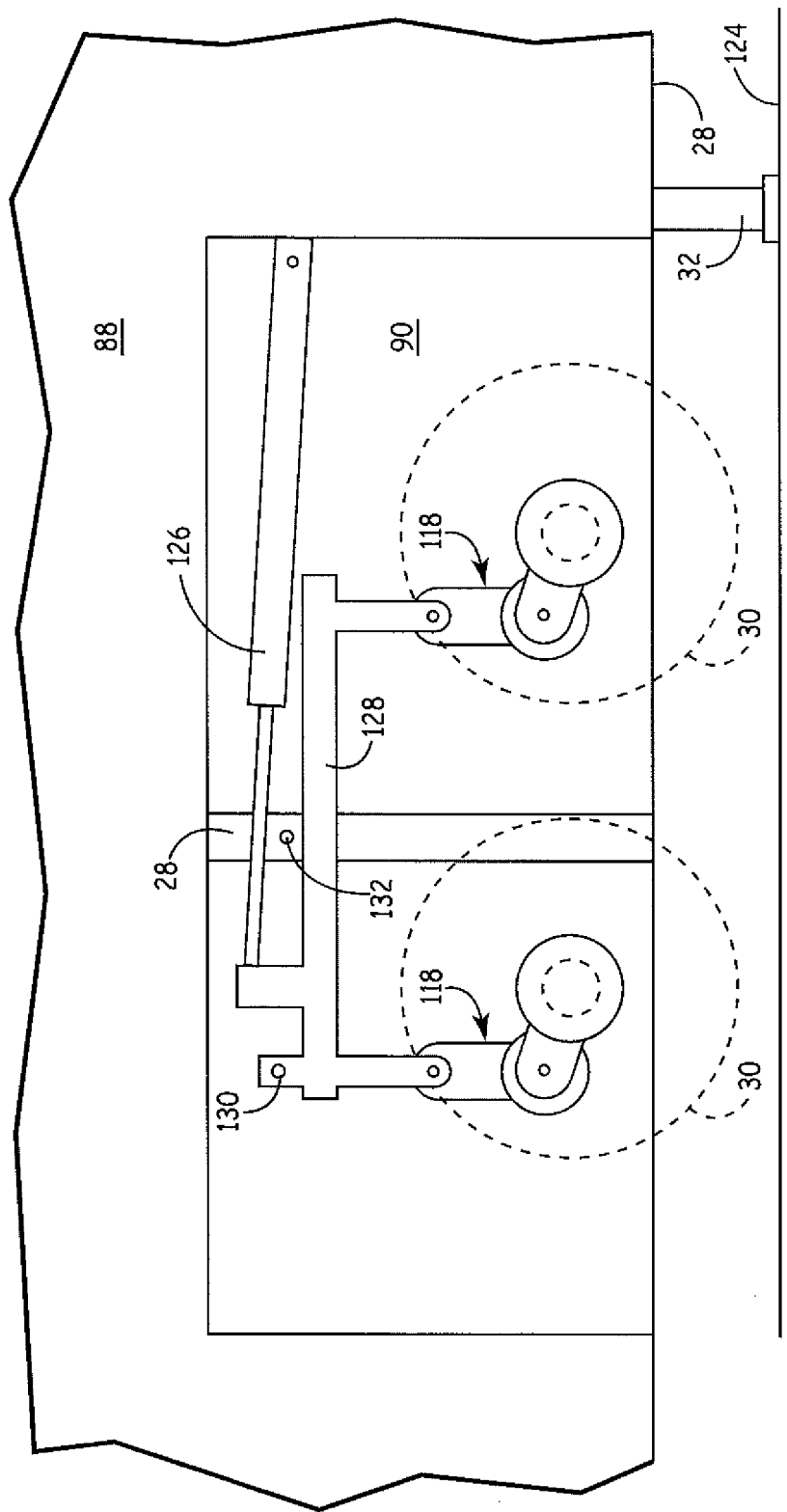
FIG. 7 is a side elevation view of a wheel well of the exemplary livestock loader with the wheels moving toward a lowered position.

As shown in FIGS. 6-8, in an exemplary embodiment, each wheel 30 is mounted on an eccentric arm assembly 118 so that a vertical position of the wheels 30 relative to frame 28 can be adjusted. FIG. 6 is a side elevation view of wheel well 90 with the wheels 30 (shown in phantom) raised up into well 90, and the loader 10 resting on ground surface 124 via adjustable legs 32. In an exemplary embodiment, adjustable legs 32 are hydraulically actuated. Moreover, the vertical position of wheels 30 is hydraulically controlled. In an exemplary embodiment, hydraulic cylinder 126 is in an extended configuration when the wheels 30 are raised relative to frame 28, as shown in FIG. 6. Loader 10 is typically in this configuration during a livestock loading operation. When the livestock loading is complete, before lowering wheels 30 relative to frame 28 of loader 10, adjustable legs 32 are extended to provide clearance for the wheel lowering operation, which is hydraulically controlled. FIG. 7 shows wheels 30 moving toward a lowered position with retraction of hydraulic cylinder 126. FIG. 8 shows wheels 30 lowered to the ground surface 124 with hydraulic cylinder 126 retracted and adjustable leg 32 raised into the frame 28 of loader 10. In an exemplary embodiment, wheels 30 are lowered during transport (as in FIG. 8) and then raised once positioned for livestock loading (as in FIG. 6) so that frame 28 rests on ground surface 124 atop adjustable legs 132.

In an exemplary embodiment, a lock mechanism is provided for maintaining a vertical position of the plurality of wheels 30 relative to the frame 28. An eccentric arm assembly 118 links each of the wheels 30 to frame 28. In the illustrated embodiment, the eccentric arm assemblies 118 in each of left and right wells 90 are linked by bar 128 that has a first locking bore 130. In the position shown in FIG. 8, first locking bore 130 is aligned with second locking bore 132 in frame 28. Thus, a pin (not shown) may be inserted into both first locking bore 130 and second locking bore 132 to mechanically fix wheels 30 in the lowered position, which would be the configuration during towing of loader 20 on wheels 30. Thus, even in the event of a hydraulic failure (i.e., a fluid leak), the position of the wheels 30 is maintained. While particular examples of a wheel lift and lock mechanism are illustrated, other structures may also be used to achieve the wheel lifting, lowering and locking features.

In a typical method of use, an operator tows loader 20, which is attached by hitch coupler 38 onto a towing vehicle. Once the vehicle operator positions loader 20 by a barn doorway 60, the operator can disengage hitch coupler 38 and pivot away arms 44 and 50, as discussed above. Subsequently, a transport vehicle 58 can be positioned close to the outlet of lift compartment 26. The operator extends adjustable legs 32, raises wheels 30, and adjusts legs 32 if needed. The operator hydraulically extends interior box 64 of slider pen 22 out toward barn 56, thereby closing any gap 62 between slider pen 22 and barn 56.

As shown in FIG. 2, where no change in elevation is required between barn doorway 60 and lower deck 40, the operator can initially hydraulically extend floor section 104 of extension 98 toward transport vehicle 58 and adjust swiveling portion 106 and flexible wall sections 112, thereby closing any gap between lift compartment 26 and the applicable deck 40, 42. The interior doors and gates of loader 20 can be initially opened and the animals can be efficiently ushered through slider pen 22, intermediate pen 24 and lift compartment 26 and onto deck 40 of transport vehicle 58. However, in cases where the animals may be wary of moving into open spaces, the interior doors and gates may be initially closed and then opened as the animals approach them or a hand-held barrier can be carried by an operator in front of the animals so that they have a sense of enclosure.

In most cases, some raising of lift compartment 26 will be required even to reach the lower deck of a transport vehicle 58. An operator typically closes at least double doors 86 and 94 between intermediate pen 24 and lift compartment 26 before loading animals onto loader 20. When barn doorway 60 is opened, a first operator may usher animals from barn 56, through doorway 60, and into slider pen 22. Some animals prefer relatively closed quarters because they are more familiar with them. In this case, the operator may choose to keep barrier 80 closed until slider pen 22 is substantially full of animals. Then the operator may open barrier 80, allowing animals to then move to intermediate pen 24. If lift compartment 26 is in a lowered position and ready for the receipt of animals, second door 94 and first door 86 between intermediate pen 24 and lift compartment 26 are opened to allow all the animals in intermediate pen 24 to move into lift compartment 26. Once lift compartment 26 is full, the first and second doors 86 and 94 are closed, typically by a second operator working the lift compartment 26. Barrier 80 is then closed so that only the number of animals that will fit into lift compartment 26 are allowed into intermediate pen 24. In an exemplary embodiment, intermediate pen 24 and lift compartment 26 have roughly equal floor areas.

At this stage, the first operator can again fill slider pen 22 and intermediate pen 24, in anticipation of filling the lift compartment 26 with the next group of animals. In the meantime, the second operator operates a lift mechanism to raise lift compartment 26 to the desired elevation, usually corresponding to the vertical level of a deck 40, 42 of transport vehicle 58. The lift mechanism in an exemplary embodiment is powered by one or more hydraulic cylinders 120. In the illustrated embodiment, one hydraulic cylinder 120 is provided on each of the left and right sides of lift compartment 26. As illustrated, the left and right hydraulic cylinders 120 are offset so that the left hydraulic cylinder is positioned toward a rear of lift compartment 26 while a right hydraulic cylinder is positioned toward a front of lift compartment 26. This allows for unobstructed views through window 121 on lift compartment 26. In another embodiment, each of left and right hydraulic cylinders 120 is centrally positioned on lift compartment 26. Moreover, other numbers of placements of hydraulic cylinders 120 can also be used. Further, two roller guide channel columns 122 are disposed on each of the left and right sides of lift compartment 126 to assure smooth and vertical ascent and descent of lift compartment 26. Moreover, in an exemplary embodiment, a hydraulic flow controller (not shown) is used to equalize hydraulic fluid among the hydraulic cylinders 120 for smooth and level vertical movement of lift compartment 26. Once lift compartment 26 has been raised to the desired height, the second operator extends extension 98 toward transport vehicle 58, adjusts swiveling portion 106 and flexible wall sections 112, thereby closing any gap between lift compartment 26 and the applicable deck 40, 42, and hydraulically opens doors 111. The second operator then guides the animals out of lift compartment 26.

The operator then retracts extension 98 at least partially to clear vehicle 58 and closes gates 111. Lift compartment 26 can then be lowered back down in preparation for loading the next group of animals, which is now ready and waiting in intermediate pen 24. The sequence is typically repeated until transport vehicle 58 is full and/or barn 56 is empty. In an exemplary embodiment, loader 20 also includes electrical lights (and possibly other components such as fans, heaters, etc.) connectable to a power source on barn 56. Thus, in a typical use, the animals will not be exposed to any outdoor environmental conditions except for when they are on the extension 98 between lift compartment 26 and transport vehicle 58. In some embodiments, extension 98 may be configured as a closed box, similar to interior box 64 of slider pen 22, so that the entire transport process between barn 56 and transport vehicle 58 is conducted without exposing the animals to outdoor environmental elements.

Once the desired animals are loaded into transport vehicle 58, loader 20 is then prepared for transport to another location, such as another livestock raising facility or a loader cleaning facility. In an exemplary method, a user fully retracts extension 98, closes doors 110, and lowers lift compartment 26. In an exemplary method, interior doors 94, 86 and 80 of loader 20 are also closed to eliminate the possibility that they will close inadvertently during transport. Interior box 64 is retracted into slider pen 22. After transport vehicle 58 is driven away from the front of loader 20, an operator can then swing the pivot arms 44 and 50 back into position to reassemble hitch coupler 38, such as with pins (not shown). A towing vehicle is then backed up to the front of loader 20 and attached to hitch coupler 48. Wheels 30 are hydraulically lowered with respect to frame 28 and all of the adjustable legs 32 are pulled up into frame 28 to provide for the greatest road clearance (shown in FIG. 8). In a towing mode, loader 20 is supported by wheels 30 on the ground and by hitch coupler 38 on the towing vehicle. Once moved to another animal barn for continued use, the set-up steps are repeated to orient the loader 20 between the doorway of the barn and the expected animal transport trailer. The process of moving animals through the loader 20 is then repeated until as many animals as desired have been removed from the barn and loaded into one or more trailers for transport.

In a method where a change in elevation is used between intermediate pen 24 and lift compartment 26, as the animals are conveyed through livestock loader 20, they have plenty of time to rest in each of slider pen 22, intermediate pen 24, and lift compartment 26. Accordingly, they do not experience undue stress. In an exemplary method of use, about 165 hogs can be transferred from barn 56 to transport vehicle 58 in about 45 minutes with minimal stress.

If all loading has been completed for the day, loader 20 is typically towed to a cleaning facility where it can be washed and disinfected. In an exemplary embodiment, all floor and wall surfaces are constructed of aluminum or stainless steel for ease of cleaning and durability. In an exemplary embodiment, floor panels are provided with a raised pattern for increased traction. In an exemplary embodiment, all components of loader 20 are constructed to withstand the high temperatures of heat disinfection. An exemplary cycle of heat disinfection subjects loader 20 to a temperature of about 160 degrees Fahrenheit for about 45 minutes.

Exemplary method steps for the use of loader 20 follow.
Exemplary Steps for Transporting the Livestock Loader 20 to an Animal Raising Facility Such as Barn 56 and Preparing the Loader 20 for Use

- Attach loader 20 to the hitch of a towing vehicle by hitch coupler 38 (all doors 80, 86, 94 closed; extension 98 retracted into lift compartment 26; lift compartment 26 in lowered position; interior box 64 retracted into slider pen 22; wheels 30 extended downward from frame 28 and position locked by pin; adjustable legs 32 retracted upward into frame 28)
- Tow loader 20 to barn 56 and back up slider pen 22 to barn door 60
- Connect hydraulic lines (not shown) to a hydraulic power source for selective operation of hydraulic cylinders on loader 20
- Remove wheel lock pin
- Hydraulically retract wheels 30 and extend leveling legs 32 (to different extents if needed) to place slider pen 22 on concrete slab 66 outside barn door 60 and level frame 28
- Telescope interior box 64 of slider pen 22 out to meet the barn wall around barn doorway 60
- Unhitch loader 20 from the towing vehicle
- Dismantle coupling hitch 38 by removing pins and swing arms 44, 50 to sides of loader frame 28
- Drive towing vehicle away from the front of loader 20 so that animal transport vehicle 58 can pull up to front of loader 20. If the hydraulic source is on the towing vehicle, keep the towing vehicle nearby and connected by hydraulic lines to power the hydraulic cylinders on the loader (for, e.g., cylinders 120 for lift compartment 26).
- Connect electrical lines to barn 56 to provide electrical power for loader 20 (for, e.g., lights, fans, heaters, etc.) if needed
- Position animal transport vehicle 58 at the front of loader 20, near exit of lift compartment 26

Exemplary Steps for Moving Animals from Barn 56 to an Animal Transport Vehicle 58 Using the Loader 20

- Position a first operator near the rear of loader 20 (such as in the barn 56) and a second operator near the front of loader 20 (such as in lift compartment 26)
- The first operator opens barn door 60 and herds animals through barn door 60 and into interior box 64 and slider pen 22
- When slider pen 22 is full, the first operator opens barrier 80 between slider pen 22 and intermediate pen 24
- First operator herds animals into intermediate pen 24
- When intermediate pen 24 is full, the first operator closes barrier 80 between intermediate pen 24 and slider pen 22 and the first operator remains in intermediate pen 24
- The first operator opens door 86 and the second operator opens door 94 between intermediate pen 24 and lift compartment 26
- The first operator herds animals from intermediate pen 24 into lift compartment 26 and then closes door 86
- The second operator closes door 94 and operates lift mechanism (e.g., hydraulic cylinders 120) to the level of the desired animal unloading deck in transport vehicle 58
- The second operator opens doors 110, extends extension 98 toward transport vehicle 58 and adjusts swiveling portion 106 and flexible wall sections 112, thereby closing any gap between lift compartment 26 and the applicable deck 40, 42
- The second operator opens gates 111, allowing animals to move from lift compartment 26 onto extension 98 and into transport vehicle 58
- Once the animals are in transport vehicle 58, the second operator closes gates 111 and at least partially retracts extension 98 to clear vehicle 58.
- The second operator lowers lift compartment 26 back to the level of intermediate compartment 24.
- In the meantime, the first operator has directed another group of animals into intermediate compartment 24, as described above, to ready that group of animals for loading into lift compartment 26
- This process is repeated until all the desired animals are transferred from barn 56 into transport vehicle 58.
- Transport vehicle 58 may be closed and driven away and another transport vehicle parked adjacent a front of loader 20 for continued loading, if desired Exemplary Steps for Preparing Loader 20 for Transport to Another Location.

- The first operator checks that no animals remain in loader 20 and closes barn door 60
- The second operator lowers lift compartment 26
- The operators close doors 80, 86 and 94
- Disconnect any electrical lines from barn 56
- Retract interior box 64 of slider pen 22
- Extend wheels 30 and retract leveling legs 32
- Install wheel lock pin
- Disengage hydraulic lines
- Swing arms 44, 50 of coupling hitch 38 back into place and install pins
- Attach loader 20 to hitch of towing vehicle by hitch coupler 38
- Tow loader 20 to another location Although the subject of this disclosure has been described with reference to several embodiments, workers skilled in the art will recognize that changes may be made in form and detail without departing from the spirit and scope of the disclosure. For instance, while the processing of animals through the loader is discussed in an exemplary embodiment above as involving two operators, it is contemplated that the processing steps may be completed by more or fewer than two operators. Moreover, an order of the steps may be changed, and steps may be added or deleted, as suitable for a particular application. Additionally, while many of the powered components are described by being hydraulically powered, other powered mechanisms may also be used, such as those employing manual, mechanical, or electrical means, for example. Moreover, elements such as vents, windows, ports and doors may be added to the roof, walls, and barriers to increase ventilation, light, access, and sight lines in loader 20. In addition, any feature disclosed with respect to one embodiment may be incorporated in another embodiment, and vice-versa.

What is claimed is:

1. A method comprising:
    positioning a first end of an apparatus proximate an area that contains a plurality of animals;
    extending a first extension from the first end of the apparatus toward the area;
    positioning a vehicle proximate a second end of the apparatus;
    moving a first animal from the area, onto the first extension and into a first compartment of the apparatus;
    opening a first barrier, wherein the first barrier is positioned between the first compartment and a second compartment;
    moving the first animal from the first compartment to the second compartment;
    vertically moving the second compartment of the apparatus to a level of a deck of the vehicle;
    extending a second extension from the second end of the apparatus to the deck; and
    moving the first animal from the second compartment, onto the second extension and onto the vehicle deck.

2. The method of claim 1 further comprising moving the first animal from the first compartment and into a third compartment before moving the first animal from the third compartment to the second compartment.

3. The method of claim 2 wherein the animal in the third compartment is moved to the second compartment before vertically moving the second compartment.

4. The method of claim 2 further comprising opening a second barrier, wherein the second barrier is positioned between the first compartment and the third compartment.

5. The method of claim 2 further comprising opening a second barrier, wherein the second barrier is positioned between the second compartment and the third compartment.

6. The method of claim 1 wherein extending the first extension comprises moving the first extension horizontally.

7. The method of claim 1 wherein extending the first extension comprises telescoping the first extension from an interior of the first compartment.

8. The method of claim 1 wherein extending the first extension comprises extending a first side of the first extension to a different extent than extending a second side of the first extension.

9. The method of claim 1 wherein extending the second extension comprises moving the second extension horizontally.

10. The method of claim 1 wherein extending the second extension comprises swiveling a portion of the second extension about a pivot point.

11. The method of claim 1 further comprising extending a plurality of legs from the apparatus to contact a ground surface.

12. The method of claim 11 comprising extending at least some of the plurality of legs to different extents.

13. The method of claim 1 further comprising changing a vertical position of a wheel relative to a frame of the apparatus.

14. A method of animal loading using a portable loader comprises:
    moving a first animal on a substantially horizontal path from an area that contains a plurality of animals into a first compartment of the loader;
    moving the first animal on the substantially horizontal path from the first compartment into a second compartment of the loader;
    closing a barrier between the first compartment and the second compartment;
    changing an elevation of the second compartment relative to the first compartment while the first animal is in the second compartment; and
    moving a second animal on the substantially horizontal path from the area into the first compartment while the first animal is in the second compartment.

15. The method of claim 14 further comprising extending a first extension from a first end of the loader toward the area.

16. The method of claim 14 further comprising extending a second extension from a second end of the loader toward a vehicle.

17. The method of claim 14 wherein extending the second extension comprises swiveling a portion of the second extension about a pivot point.

18. A method of animal loading using a portable loader comprises:
    moving a first animal on a substantially horizontal path from an area that contains a plurality of animals into a first compartment of the loader;
    moving the first animal on the substantially horizontal path from the first compartment into a second compartment of the loader;
    changing an elevation of the second compartment relative to the first compartment while the first animal is in the second compartment;
    moving a second animal on the substantially horizontal path from the area into the first compartment while the first animal is in the second compartment; and
    moving the first animal from the first compartment and into a third compartment before moving the first animal from the third compartment to the second compartment.

19. The method of claim 18 wherein the animal in the third compartment is moved to the second compartment before changing the elevation of the second compartment.

\* \* \* \* \*